United States Patent [19]

Wagner

[11] 4,161,263

[45] Jul. 17, 1979

[54] HANDLING SYSTEM FOR FLEXIBLE SHIPPING CONTAINERS

[75] Inventor: Robert J. Wagner, Wernersville, Pa.

[73] Assignee: Sonoco Products Company, Hartsville, S.C.

[21] Appl. No.: 865,495

[22] Filed: Dec. 29, 1977

[51] Int. Cl.² .................. B60P 3/22; B65D 35/28
[52] U.S. Cl. .......................... 222/100; 105/360; 280/5 D
[58] Field of Search ............... 222/99–102, 222/105, 106; 280/5 D; 105/468, 496, 358, 360, 239; 220/85 B; 298/7, 24

[56] References Cited

U.S. PATENT DOCUMENTS

| | | | |
|---|---|---|---|
| 2,712,797 | 7/1955 | Woehrle et al. | 280/5 D X |
| 3,095,206 | 6/1963 | Fresia et al. | 222/99 X |
| 3,756,469 | 9/1973 | Clark et al. | 222/105 |
| 4,092,051 | 5/1978 | D'Orazio | 222/105 X |

FOREIGN PATENT DOCUMENTS 1018232  1/1966  United Kingdom ............. 222/99

Primary Examiner—Francis J. Bartuska
Attorney, Agent, or Firm—Dennison, Dennison, Meserole & Pollack

[57] ABSTRACT

A system for storing and handling collapsible rubberized containers used in the transporting of fluent materials within bulk material transporting trailers and the like. The system utilizes a rack for lengthwise travel within the trailer with the rack incorporating a drum, power driven in opposite directions for a selective winding of the flexible container thereon and therefrom.

3 Claims, 7 Drawing Figures

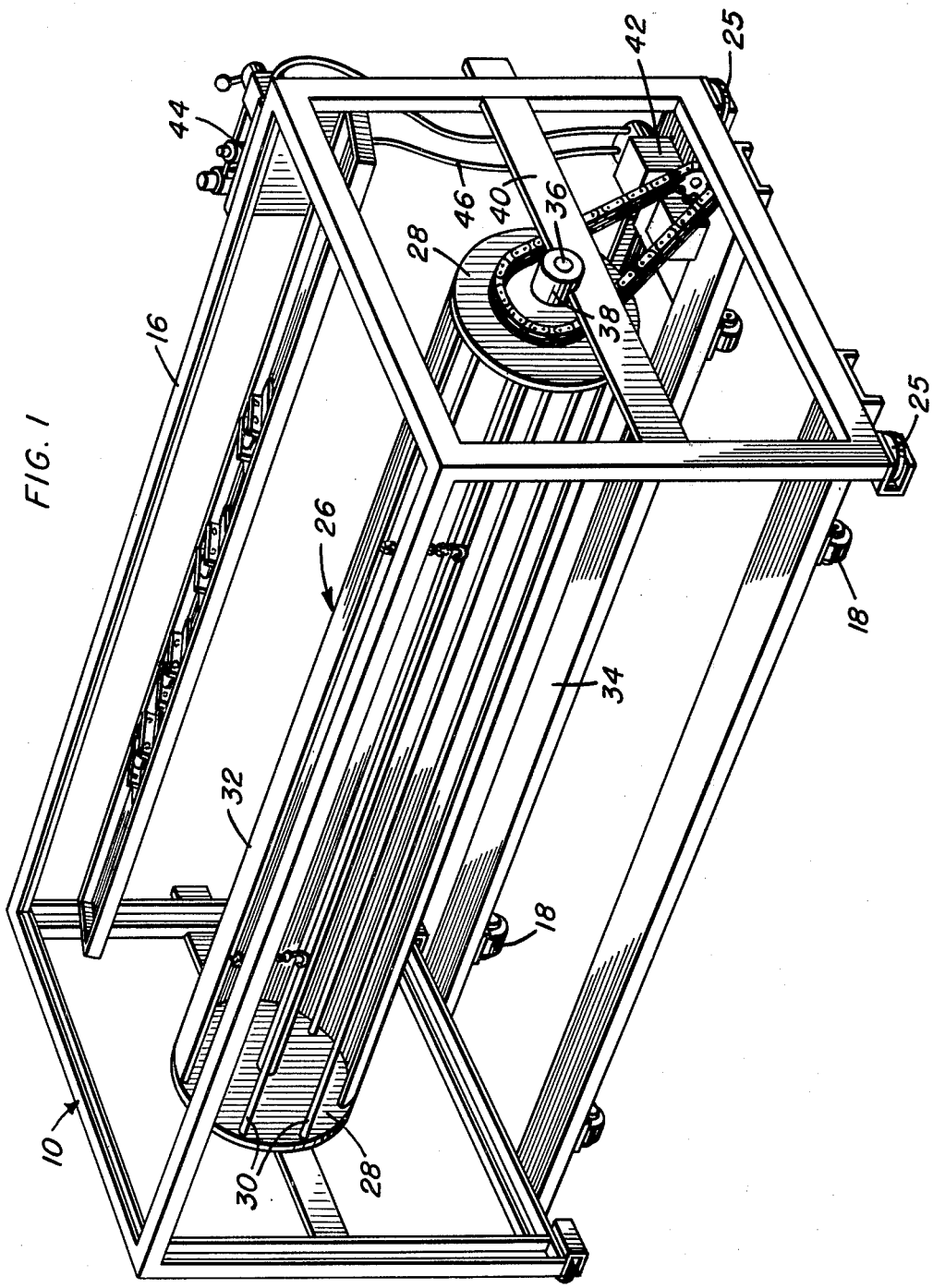

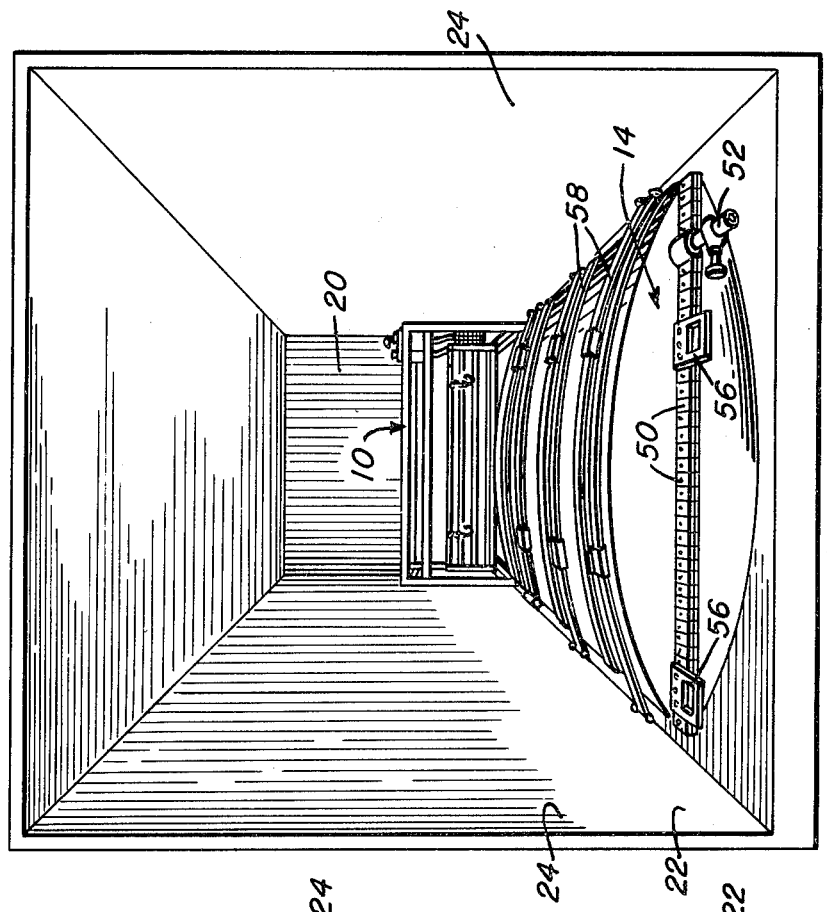
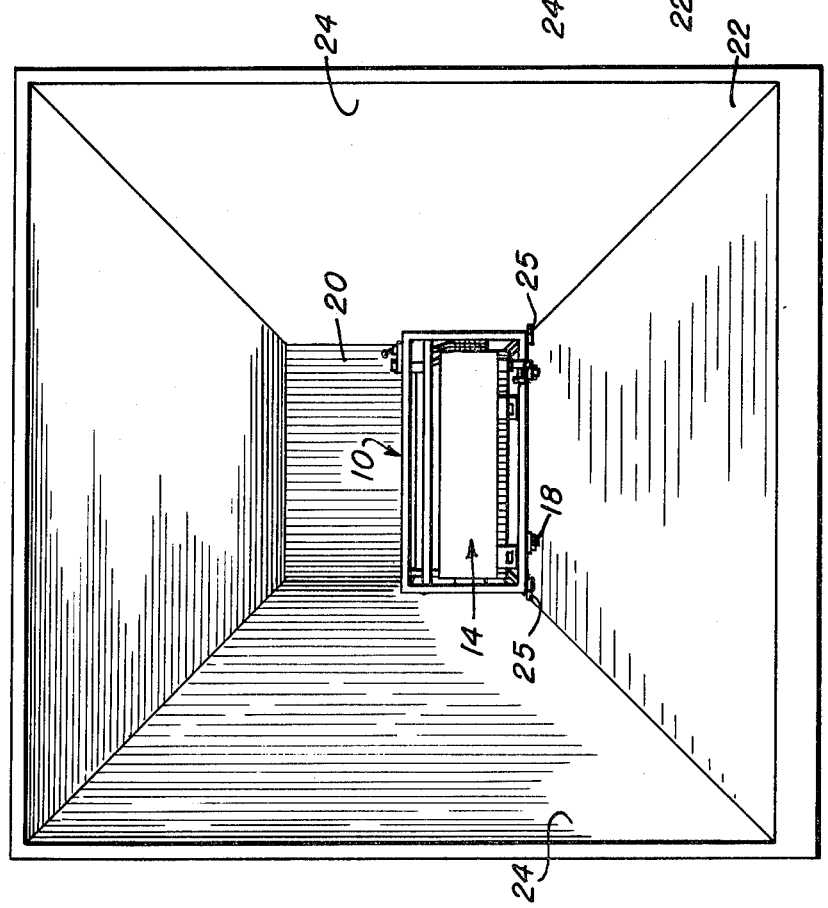

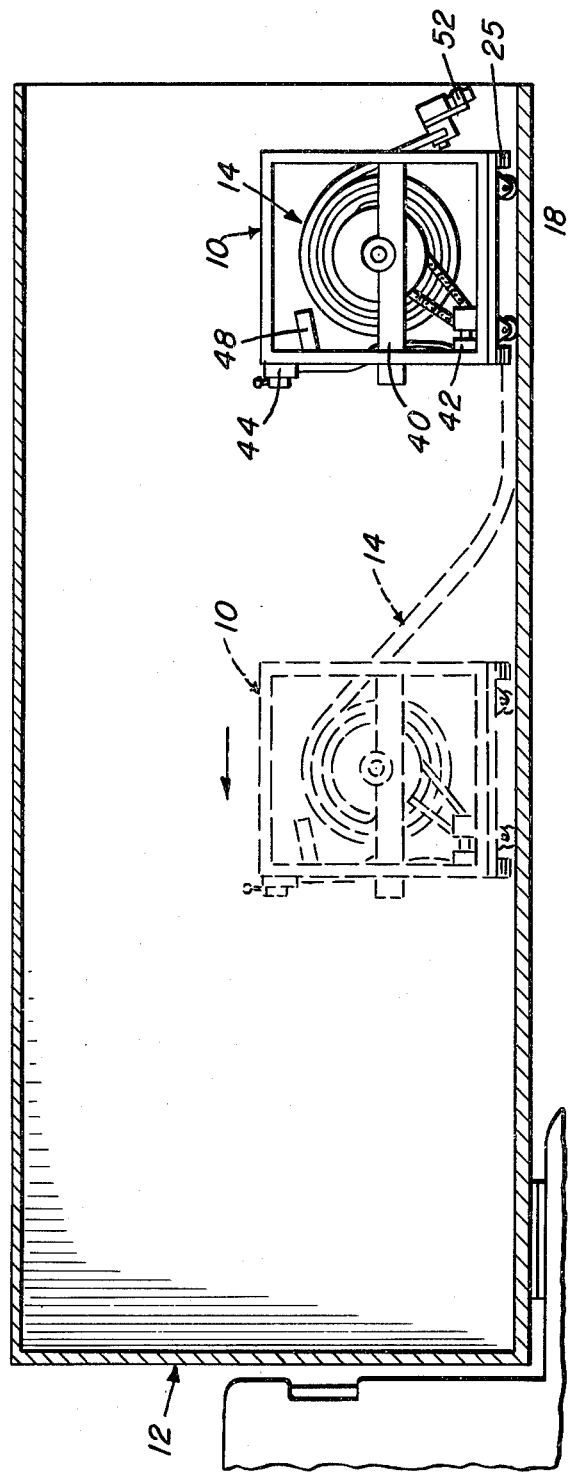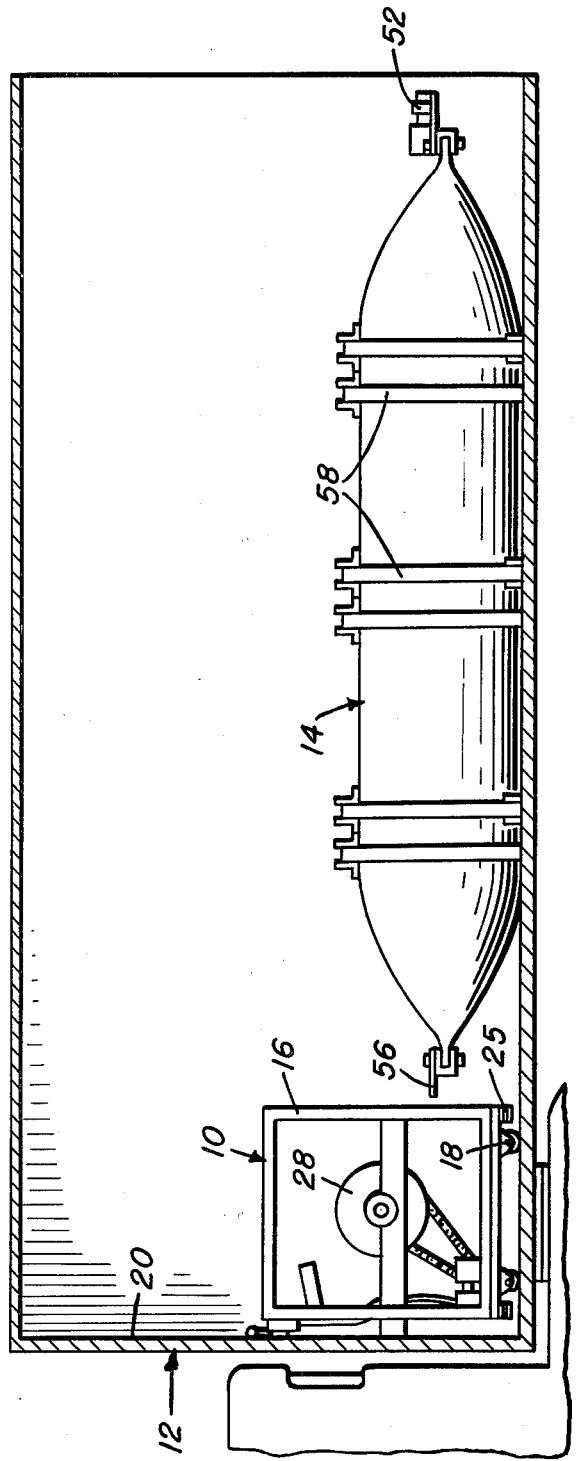

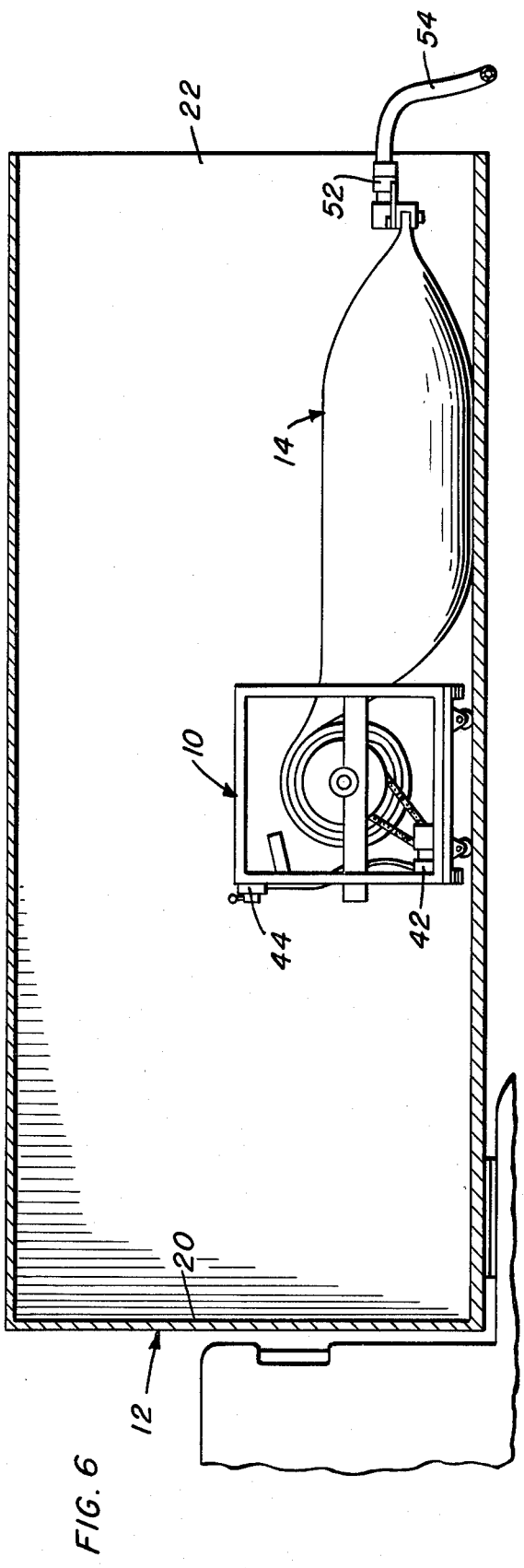
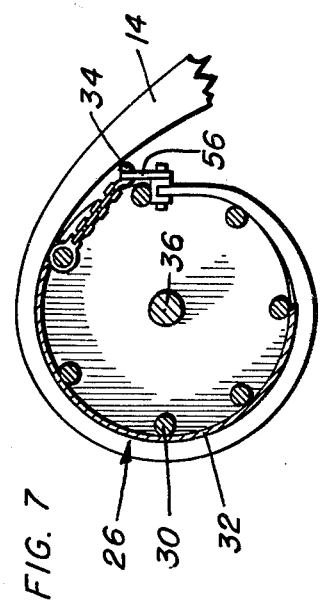

HANDLING SYSTEM FOR FLEXIBLE SHIPPING CONTAINERS

BACKGROUND OF THE INVENTION

The present invention is generally concerned with the transporting of fluent materials by means of collapsible rubberized tanks positioned within conventional van-type freight containers or trailer bodies. More specifically, the invention relates to a system for the handling and storage of the tanks. Collapsible rubberized storage tanks for liquids or other fluent materials have come into common usage as a convenient means for the transporting of such materials in transport containers more commonly associated with bulk materials, for example truck trailers, railroad cars, box containers, and the like. The patent to Headrick, U.S. Pat. No. 3,416,762, issued Dec. 17, 1968, is of interest in illustrating a rubberized tank or pillow tank of the type with which the present invention is generally concerned.

While the collapsible or flexible shipping container fills a definite need and provides significant advantages in enabling the use of conventional transport equipment, problems do arise in connection with its use, both because of the basic unloaded weight of the container, in some instances 750 pounds or more, and because of the substantial capacity thereof, normally between 2,000 and 3,000 gallons which, when dealing with a fluent silicate, as an example, could weigh more than 30,000 pounds.

A disadvantage inherently associated with the use of the tank within conventional transport vehicles is that, even when empty, the bulk of the tank generally precludes use of the vehicle for other transport usages. For example, subsequent to the delivery of a fluent product utilizing the tank, the collapsed tank remains on the floor of the trailer and the trailer returns empty to the originating point. No practical means have heretofore been devised for the compacting and storage of the empty tanks so as to free the interior of the basic shipping container or trailer for other purposes. In fact, prior to the present invention, any handling of the bag, whether positioning or removing the bag, or effecting a complete emptying thereof, required extensive manual labor.

The following patents, in addition to the above referred to Headrick patent, constitute the most pertinent prior art known to Applicant:

U.S. Pat. No. 2,712,797, Woehrle, et al., July 12, 1955
U.S. Pat. No. 2,803,491, Brown, Aug. 20, 1957
U.S. Pat. No. 3,514,151, Hacker, May 26, 1970
U.S. Pat. No. 3,756,469, Clark, et al., Sept. 4, 1973
U.S. Pat. No. 3,951,284, Fell, et al., Apr. 20, 1976
U.S. Pat. No. 3,980,196, Paulyson, et al., Sept. 14, 1976
U.S. Pat. No. 4,054,226, Bjelland, et al., Oct. 18, 1977

SUMMARY OF THE INVENTION

The present invention proposes a unique system for facilitating the handling of the fluent material receiving tanks. In connection therewith, the primary object of the invention resides in the provision of means for effectively and efficiently compacting the emptied tank, subsequent to a delivery, within the main carrier so as to free the interior of the main carrier for use in the transport of bulk shipments or the like.

Secondary advantages reside in the provision of means whereby the positioning of the empty tank is easily effected with the expenditure of little actual manual effort and in a minimum amount of time as compared to the normally difficult and time-consuming procedures more conventionally utilized.

It has also been found that the proposed bag handling system is of substantial assistance in the dispensing of the product from the bag, the actual roll compacting of the bag being effected simultaneously with the dispensing of the material.

Basically, the system herein proposed involves the use of a traveling rack mounted within the trailer or the like for movement along the length thereof between the inner end and the discharge end. The rack mounts an enlarged drum or reel powered by appropriate means for alternate driving in opposite directions. The drum is adapted to engage the inner end of the bag and have the bag rolled entirely thereon so as to provide for a compact storage of the bag. In such instances, the rack and bag will normally be positioned at the extreme inner end of the trailer so as to free substantially the entire interior of the trailer for use as desired. When the bag is to be positioned, the rack is freely rolled to the discharge end of the trailer, the forward or discharge end of the bag positioned, and at least initially secured, and the drum activated so as to effect an unrolling of the bag therefrom in conjunction with a drawing of the rack toward the inner end of the trailer. Actually, it is conceivable that the track, through a power unwinding of the bag from the drum, with self-propel itself as the bag is laid on the floor or deck. After a complete unrolling of the bag, the inner end thereof is easily unhooked from the drum with the bag thus being positioned for use in the conventional manner.

When an unloading of the bag is to be effected at the delivery site, the inner end of the bag can be engaged with the rack drum and the drum activated so as to effect a rolling of the bag unto the drum in conjunction with a dispensing of the material. Due to the substantial weight of the loaded bag, the rack will be easily drawn forward as the bag is rolled therein, being in effect a self-propelling rack. By the same token, the raising of the inner portion of the bag and the compressing thereof will enhance the discharge of the material. ultimately, all of the material will be discharged and, generally simultaneously therewith, the rolling of the bag on the rack will be completed at the discharge end of the trailer. At that time, the rolled bag is easily stored at the forward or inner end of the trailer by a forward rolling of the rack itself.

DESCRIPTION OF DRAWINGS

FIG. 1 is a perspective view of the tank storing rack of the present invention;

FIG. 2 is a view from the rear or discharge end of a trailer with the rack of the present invention in a forward stored position therein;

FIG. 3 is a view similar to FIG. 2 with the tank positioned and filled with fluent material;

FIG. 4 is a side schematic view with the rack and mounted tank positioned at the discharge end of the trailer, in conjunction with a phantom-line showing of the rack at an intermediate point with the tank partially unrolled therefrom;

FIG. 5 is a schematic side view of the completely retracted rack and detached fully loaded tank;

FIG. 6 is a schematic side view of a partially emptied tank with the tank partially received within the rack; and FIG. 7 schematically illustrates the engagement between the rack and the bag.

DESCRIPTION OF THE PREFERRED EMBODIMENT

Referring now specifically to the drawings, reference 10 is used to generally designate the tank handling rack of the present invention. This rack 10 will mount within and travel along the length of any conventional bulk material transporting container. While not limited thereto, the bulk material container will normally be the trailer of a tractor trailer vehicle and, for purposes of illustration, the rack 10 has been presented in association with such a trailer, herein designated by reference 12. The rack 10 is positioned within the trailer 12 and is specifically intended as a means for facilitating the storing, positioning and retrieval of an enlarged, flexible, fluent material receiving bag 14.

The rack 10 includes an open rectangular structural frame 16 suitably braced and rigidified so as to accommodate the weight of the empty bag 14 as well as the stresses introduced to the rack during the manipulation of the bag.

Suitable enlarged castors 18 are affixed to the bottom of the frame 16 and allow for a free traveling of the rack 10 between the inner end 20 of the trailer 12 and the outer or discharged end 22 thereof. The rack 10 itself is of a length generally equal to the transverse width of the trailer 12 between the opposed side walls 24 thereof, whereby these opposed side walls 24 of the trailer 12 position and guide the rack 10 during the travel thereof along the length of the trailer. This is effected primarily by a pair of wall engaging laterally projecting rollers 25 mounted front and rear on each end of the rack, normally toward the lower portion thereof. If deemed desirable, appropriate guide rails or tracks can also be provided along the opposed sides 24 of the trailer 12.

The actual physical handling of the bag or tank 14 is effected by means of an enlarged central reel or drum 26 extending lengthwise centrally of the rack 10. The drum 26 includes a pair of opposed end plates 28 interconnected by peripherally spaced rigid rods 30 which, in conjunction with the end plates 28, form the major structural components of the drum 26. Approximately one half of the circumference of the drum is closed or provided with a continuous support surface by means of an arcute cover plate 32 extending between the end plates 28 and affixed to both the end plates 28 and the rods 30. A pair of bag or tank end engaging hooks 34 are suspended by short lengths of flexible chain from the drum rod 30 at what might be considered the trailing edge of the plate 32 when the drum 26, as illustrated in FIG. 7, is driven in a counterclockwise direction.

The drum 26 is mounted on and affixed to an elongated central shaft 36. The opposed ends of the shaft 36 project beyond the drum and plates 28 and are rotatably received within appropriate collars or journals 38 positioned by means of framework bracing cross plates 40 at the opposed ends of the rack framework 16.

It is contemplated that the drum 26 be power driven selectively in opposite directions whereby a power handling of the heavy and bulky bag or tank can be effected during both the rolling and unrolling of the bag. While any appropriate power drive can be utilized, such as for example an electric motor, gasoline/diesel motor, or air motor, for purposes of illustration, an air motor has generally schematically been shown. The motor 42 will normally be mounted at one end of the framework 16, preferably toward the inner side thereof, or that side facing the inner end 20 of the trailer 12. The necessary controls 44 will in turn normally be positioned at a readily accessible height toward the top of the structural framework 16. The actual driving of the shaft 36, and hence the drum 26, will, in the illustrated example, be achieved by an endless sprocket chain engaged between an enlarged sprocket 46 affixed to one end of the shaft 36 and, indirectly, the drive shaft of the motor 42. Appropriate gear reduction means will be provided as required. The motor, as previously indicated, is to be reversible. Finally, if so desired, an appropriate equipment or storage shelf 48 can be provided on the structural frame 16.

The storage bag or tank 14, as previously indicated, is particularly intended and adapted for the handling of fluent material, including liquids. granular material, and the like. Structurally, the tank 14 is of a rubberized material capable of resiliently expanding to accommodate the introduced product. The opposed ends of the bag or tank 14 are sealed by a series of edge clamps 50 extending therealong with the discharge end of the bag incorporating a nozzle unit 52 for the accommodation of appropriate hose means 54 used in the filling and emptying of the tank 14. In addition, both ends of the tank 14 will be provided with handling loops or grips 56 for use in the manipulation and positioning of the tank. The loops 56 at the inner end of the tank 14 are particularly adapted to be engaged by the chain suspended hooks 34 of the drum 26 so as to enable a positive interlock between the drum 26 and the tank 14, particularly when initiating a rolling up of the tank onto the drum. Normally, the tank 14 will be completely disengaged from the drum during those periods when the tank is filled with the product. Further, at such times, and as suggested in the drawings, the tank will be stabilized within the trailer 12 by means of appropriate removable cross straps 58 which will extend from appropriate tie downs, normally provided within the bed or floor of the trailer.

Turning now to the actual manner in which the tank handling and storage system operates, attention is initially directed to FIGS. 2 and 3. FIG. 2 illustrates the tank 14 completely rolled in storage position on the drum 26 of the rack 10 with the rack in stored position at the inner end of the trailer 12 so as to free the interior of the trailer for bulk shipments or the like. FIG. 3 illustrates the in-use position of the tank 14, the tank extending the full length, or substantially the full length, of the trailer with the rack 10 stored at the inner end of the trailer and disengaged from the tank 14.

In order to best follow the manner in which the rack 10 operates in conjunction with the tank 14 and trailer 12, in the handling of the tank 14, attention is particularly directed to FIGS. 4, 5 and 6. In FIG. 4, the rack, in full line, is positioned at the discharge end 22 of the trailer 12 in preparation for an unrolling or laying out of the tank 14. The outer or discharge end of the tank 14 is stabilized at the discharge end of the trailer, either by being manually held or by a hooking of the loops 56 on appropriate projections, and the power means activated so as to drive the drum 26 in a direction effecting the unrolling of the tank therefrom. In conjunction with the unrolling of the tank 14, the rack 10 is moved forward toward the inner end 20 of the trailer 12. Initially, it may be necessary to manually guide and forwardly draw the rack 10. However, it is contemplated that once at least a moderate portion of the tank 14 has been unrolled onto the floor of the trailer 12, the rack, through the reactive force of the unrolling tank, will in effect propel itself toward the inner trailer end 20. The rack, at an intermediate point during the unrolling operation, is illustrated in phantom lines in FIG. 4.

FIG. 5 illustrates the completely unrolled and positioned tank 14 with the product loaded therein. In this figure, it will also be noted that the rack 10 is at its inner stored position disengaged from the tank 14.

When the product or material is to be dispensed from the tank 14, it is contemplated that this can be effected simultaneously with a rolling of the tank 14 onto the rack drum 26 as suggested in FIG. 6. It will be noted that the tank is rolled up and over the top of the drum whereby there is a tendency to elevate the inner end of the tank and enhance the flow of the material therefrom. The actual engagement of the inner end of the tank 14 with the drum 26 is effected through the drum mounted hooks 34 engaging the inner loops or grips 56. The flexible chain mounts for the hooks 34 facilitate the engagement of the hooks 34 with the bag loops.

Because of the free rolling guided nature of the rack 10, and the substantial weight of the loaded tank 14, the rack, upon a power driving of the drum for a winding of the emptying tank 14 thereabout, may even be automatically drawn toward the discharge end of the tank and trailer during substantially the entire emptying cycle. A manual guiding of the rack is also possible. However, the entire operation, from the initial positioning of the empty bag to the unloading of the material from the full bag, can be easily accomplished by a single person, for example the driver of the tractor trailer vehicle, without any of the excess manual labor heretofore associated with tanks of this type and without the heretofore required efforts of several persons.

After the emptied tank 14 has been completely rolled onto the rack drum 26, the material discharge equipment is disengaged from the tank and the loaded rack easily moved to the inner end of the trailer 12 so as to free substantially the entire interior of the trailer for bulk materials or the like, thus avoiding the necessity of returning to the original source without a pay load. If deemed necessary, the loaded rack can be secured at the inner end of the trailer by any appropriate means, for example the tie down straps used in association with the loaded tank.

As will be appreciated, the equipment described is adaptable for use in manners differing slightly from those previously described. For example, a complete emptying of the tank 14 can be effected prior to a rolling of the tank onto the power driven drum. Likewise, while not considered a particularly satisfactory procedure, the rack can be retained at the inner end of the trailer and the bag manually drawn forward in conjunction with a power unrolling thereof from the drum. Further, remote controls can be provided for the operation of the reversible drum driving motor to allow for an operation of the complete system from the exterior of the trailer. Thus, it will be appreciated that it is not desired to limit the invention to the exact construction and operations shown and described, but rather, all suitable modifications and equivalents may be resorted to, falling within the scope of the invention as claimed.

I claim:

1. For use within a bulk freight shipping container having a support floor, an inner end, and an outer discharge end; a handling system comprising a collapsible fluent material shipping tank selectively positionable on and along the support floor, said system further comprising an independent handling and storage rack positionable on said support floor inward of the tank, said rack including means mounted thereon for supporting said rack on said support floor for free travel of the rack along said floor between the inner end and the outer discharge end both in conjunction with and relative to said tank, said tank having an inner end and an outer discharge end, means for selectively engaging said rack with the inner end of the tank, and power means on said rack for travel therewith both for a selective power drawing of said tank into a collapsed stored position on said rack in conjunction with a traveling of the rack toward said discharge end, and a selective discharge of said tank from said rack.

2. The handling system of claim 1 wherein said freight container includes opposed side walls, said rack mounting guide rollers projecting laterally from said rack and for guiding engagement with the opposed side walls for rack guiding travel therealong.

3. The handling system of claim 2 wherein said rack includes a drum rotatably mounted thereon for a selective rolling of the tank thereabout, said power means drivingly engaging said drum for a selective reversible driving thereof, said means for selectively engaging the inner end of the tank with the rack comprising hook means on said drum and hook engagable components on said tank.

* * * * *